United States Patent
Rao et al.

(10) Patent No.: US 9,823,349 B2
(45) Date of Patent: Nov. 21, 2017

(54) DRIVER ENTRY DETECTOR FOR A MOTOR VEHICLE

(71) Applicant: FORD GLOBAL TECHNOLOGIES, LLC, Dearborn, MO (US)

(72) Inventors: Manoharprasad K. Rao, Novi, MI (US); Mark A. Cuddihy, New Boston, MI (US); Carla Ann Gale, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/254,603

(22) Filed: Apr. 16, 2014

(65) Prior Publication Data

US 2015/0301175 A1    Oct. 22, 2015

(51) Int. Cl.
| | | |
|---|---|---|
| G06F 19/00 | (2011.01) | |
| G01S 17/02 | (2006.01) | |
| G01J 1/42 | (2006.01) | |
| B60N 2/00 | (2006.01) | |
| B60R 16/037 | (2006.01) | |
| G01J 1/16 | (2006.01) | |
| G01S 7/00 | (2006.01) | |

(52) U.S. Cl.
CPC ............ *G01S 17/026* (2013.01); *B60N 2/002* (2013.01); *B60R 16/037* (2013.01); *G01J 1/1626* (2013.01); *G01J 1/4204* (2013.01); *G01S 7/003* (2013.01)

(58) Field of Classification Search
USPC ............ 701/49, 45, 468; 340/933, 934, 935; 250/559.38, 221; 280/735, 785; 307/10.1
See application file for complete search history.

(56) References Cited

U.S. PATENT DOCUMENTS

| | | | |
|---|---|---|---|
| 5,871,232 A * | 2/1999 | White ............................ | 280/735 |
| 6,007,095 A | 12/1999 | Stanley | |
| 6,026,340 A * | 2/2000 | Corrado ................. | B60N 2/002 |
| | | | 280/735 |
| 6,252,240 B1 * | 6/2001 | Gillis et al. .............. | 250/559.38 |
| 6,417,783 B1 * | 7/2002 | Gabler et al. ................. | 340/933 |
| 6,452,288 B1 * | 9/2002 | Roth et al. .................... | 307/10.1 |
| 6,517,106 B1 | 2/2003 | Stanley et al. | |
| 7,489,303 B1 * | 2/2009 | Pryor ...................... | B60K 35/00 |
| | | | 345/173 |
| 9,055,022 B2 * | 6/2015 | Ricci ...................... | G06F 3/0484 |
| 2002/0195806 A1 * | 12/2002 | Thomas et al. ............... | 280/735 |
| 2003/0142849 A1 * | 7/2003 | Lemelson ............ | B60Q 1/0023 |
| | | | 382/104 |
| 2008/0142713 A1 | 6/2008 | Breed et al. | |

(Continued)

FOREIGN PATENT DOCUMENTS

| | | |
|---|---|---|
| DE | 3721726 A1 | 1/1989 |
| EP | 0962894 A2 | 8/1999 |

*Primary Examiner* — Ronnie Mancho
(74) *Attorney, Agent, or Firm* — LeClairRyan

(57) ABSTRACT

Driver-detection technology includes various systems, methods, and apparatuses. For example, an active infrared (IR) sensor might be affixed in the driver's footwell of a motor vehicle and detect the driver's entry into the vehicle. The detection of the driver by the IR sensor is usable to personalize motor-vehicle features, such as seat position, steering-wheel position, interior lighting, radio controls, mirror angles, and touch-screen configuration, among others.

14 Claims, 4 Drawing Sheets

(56) References Cited

U.S. PATENT DOCUMENTS

| | | | | |
|---|---|---|---|---|
| 2008/0211779 A1* | 9/2008 | Pryor | ................. | G01C 21/3664 |
| | | | | 345/173 |
| 2008/0274798 A1* | 11/2008 | Walker | ................... | G07F 17/32 |
| | | | | 463/25 |
| 2009/0055180 A1* | 2/2009 | Coon | .................. | B60R 16/0373 |
| | | | | 704/251 |
| 2011/0098868 A1* | 4/2011 | Busse | ................... | G01S 17/026 |
| | | | | 700/295 |
| 2012/0296567 A1* | 11/2012 | Breed | .......................... | 701/468 |
| 2013/0020883 A1* | 1/2013 | Ashoff | ................... | H05B 35/00 |
| | | | | 307/116 |
| 2014/0309813 A1* | 10/2014 | Ricci | ....................... | B60Q 1/00 |
| | | | | 701/2 |

\* cited by examiner

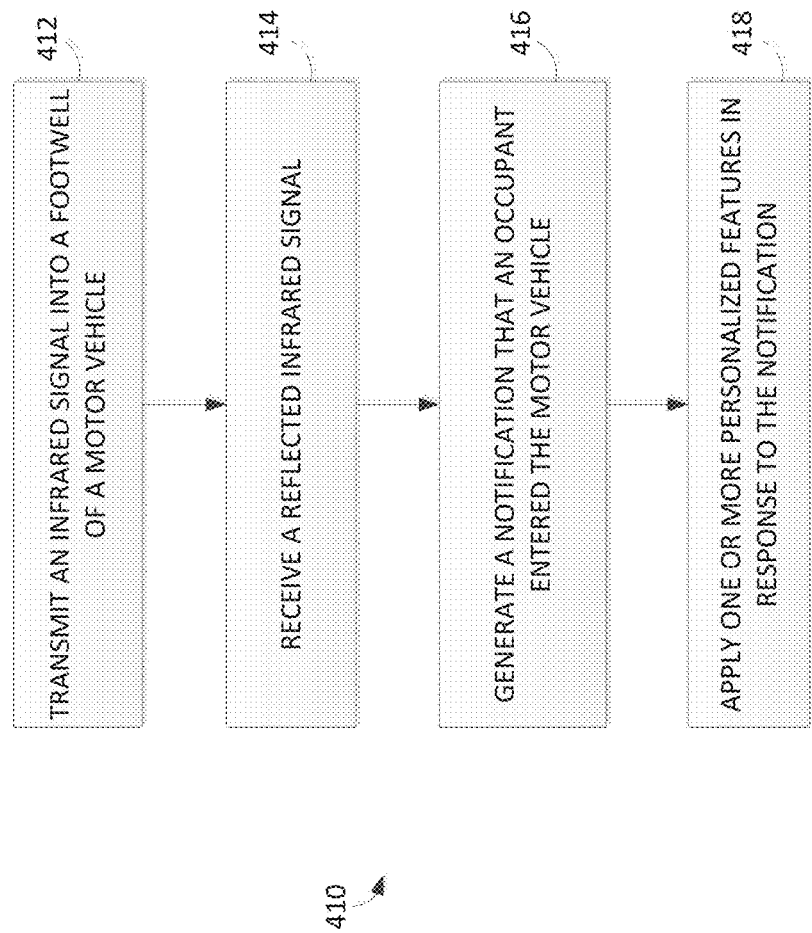

DRIVER ENTRY DETECTOR FOR A MOTOR VEHICLE

TECHNICAL FIELD

Subject matter described herein is directed to detecting entry of an occupant into a vehicle to facilitate motor-vehicle feature personalization.

BACKGROUND

Motor vehicles are equipped with a variety of features that can be personalized, such as seat position, steering-wheel position, interior lighting, radio controls, mirror angles, and touch-screen configuration, among others. Some systems automatically personalize one or more features in response to various detections, such as a door closing or a key being inserted into an ignition. But the earlier the detection of a driver can be made, the more time exists pre-ignition to personalize features.

SUMMARY

An embodiment of the present invention is directed to an infrared (IR) sensor that is affixed in the driver's footwell of a motor vehicle and that detects the driver's entry into the vehicle. For example, the active IR sensor might be attached to a driver seat. The detection of the driver by the IR sensor is usable to personalize motor vehicle features.

In one embodiment, the present invention includes an active infrared (IR) sensor that is contained on a single integrated chip and that is usable to detect entry of an occupant into a motor vehicle. The sensor includes an IR emitter that transmits a signal and a signal receiver that detects a reflection of the signal. The sensor also includes a microcontroller that receives an indication from the signal receiver that the reflection was detected, and an output converter that converts the indication to an automotive-compatible protocol. A power conditioner adapts a 12V power supply to a sensor-usable voltage.

Another embodiment of the present invention includes a method for personalizing a feature of a motor vehicle. According to the method, an infrared signal is transmitted into a footwell of the motor vehicle. In addition, a reflected infrared signal is received. In response to receiving the reflected signal, a notification is generated that an occupant entered the motor vehicle. A personalized feature is applied in response to the notification.

Embodiments of the invention are defined by the claims below, not this summary. A high-level overview of various aspects of the invention is provided here to provide an overview of the disclosure, and to introduce a selection of concepts that are further described below in the detailed-description section. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein:

FIG. 4 depicts a flow diagram showing exemplary steps carried out in accordance with an embodiment of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different elements or combinations of elements similar to the ones described in this document, in conjunction with other present or future technologies. Terms should not be interpreted as implying any particular order among or between various steps herein disclosed except when the order of individual steps is explicitly stated.

An embodiment of the present invention is directed to an infrared (IR) sensor that is affixed in the driver's footwell of a motor vehicle driver footwell and that detects the driver's entry into the vehicle. The detection of the driver by the IR sensor is usable to personalize motor vehicle features, such as seat position, steering-wheel position, interior lighting, radio controls, mirror angles, and touch-screen configuration, among others.

Figure 1:
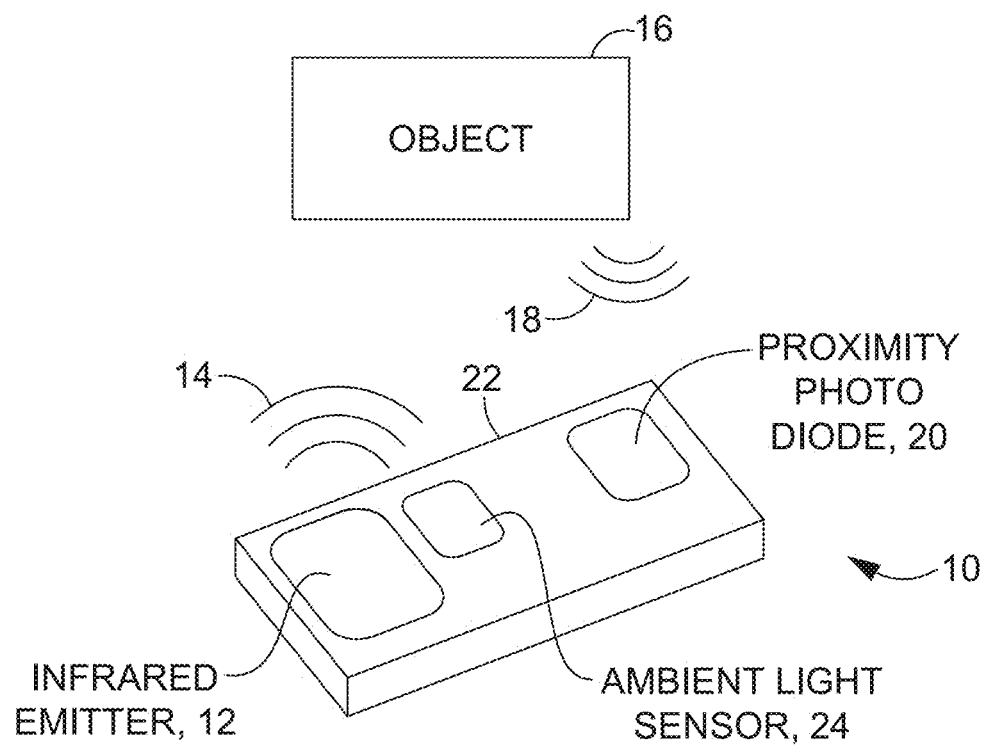
FIG. 1 depicts an exemplary infrared (IR) sensor in accordance with an embodiment of the present invention.

In one embodiment, the IR sensor is an active IR sensor, and an exemplary depiction of an active IR sensor 10 is depicted in FIG. 1. The active IR sensor includes an infrared (IR) emitter 12 that transmits a signal 14. The signal 12 reflects off of one or more objects 16, and the reflected signal 18 is detected by the photo-diode signal receiver 20. The active IR sensor 10 also includes an ambient light sensor 24 which measures an ambient light of the surrounding environment. The measurements provided by the ambient light sensor 24 might be used to control various parameters, such as the intensity of the signal provided by the emitter 12 and the sensitivity of the photo diode 20.

The active IR sensor 10 includes a housing 22 that contains various electrical components, such as a circuitry, wiring, and a microcontroller. The housing 22 might be of various sizes depending on a use of the sensor 10, and in one aspect, the housing measures about 5 mm×2.4 mm×0.8 mm. In one embodiment, the active IR sensor is contained on a single integrated chip (IC). The microcontroller performs various functions, such as signal threshold detection and providing startup logic for the IC, among other things. In addition, the active IR sensor 10 includes various components that adapt the sensor to be used in an automobile context.

Figure 2:
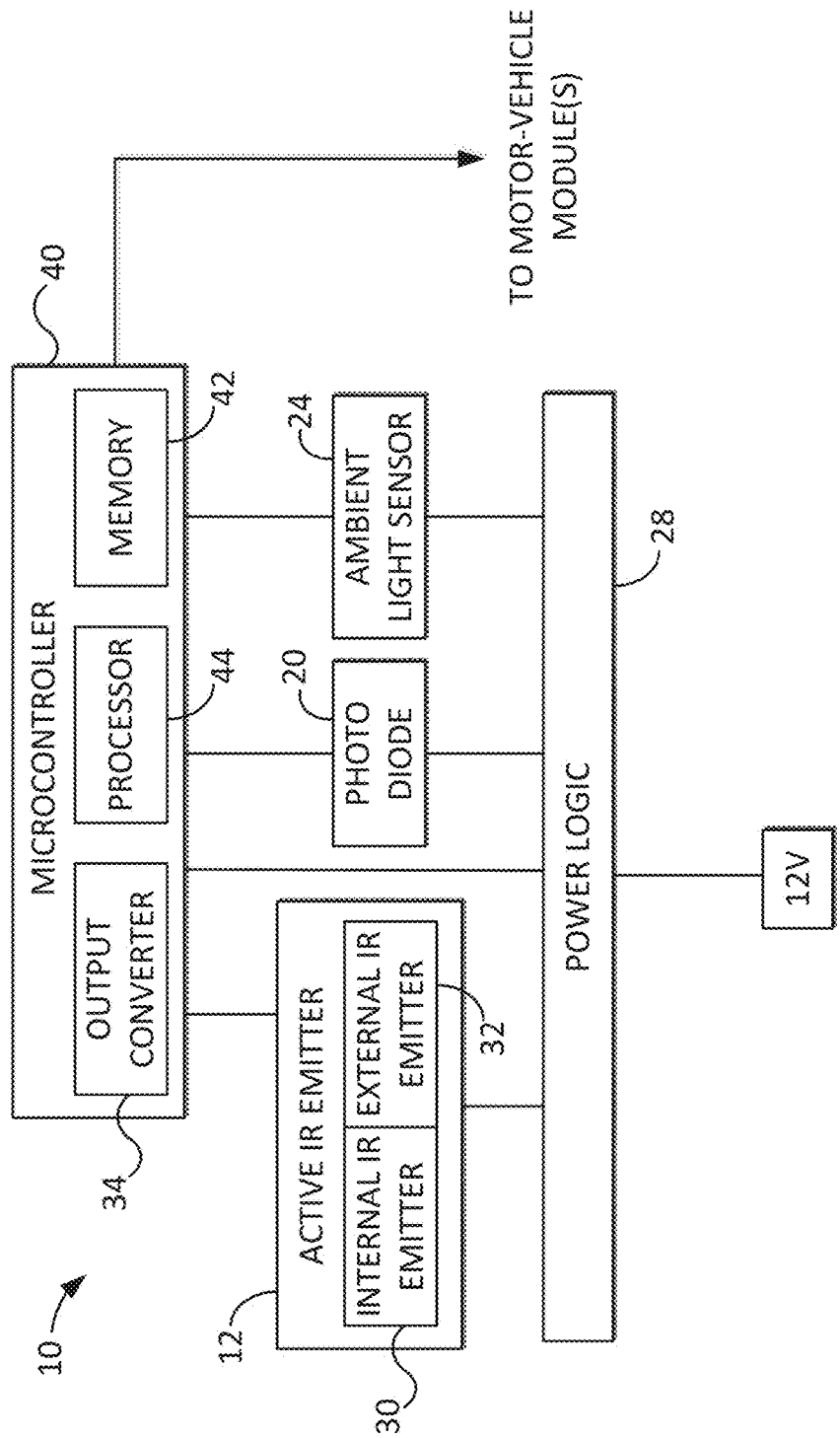
FIG. 2 depicts a schematic diagram of an exemplary IR sensor in accordance with an embodiment of the present invention.

Referring to FIG. 2, an illustrative schematic diagram shows various components of an exemplary active IR sensor 10. The active IR sensor 10 includes various components, such as a microcontroller 40 having memory 42 and a processor 44. In addition, the active IR sensor 10 includes other components appropriate for a motor vehicle context.

In one embodiment, the active IR sensor 10 includes a power-logic component 28 (e.g., power conditioner) which provides an appropriate voltage to the chip and emitter components. For example, if the chip operates on 3.3V, the power-logic component adapts or regulates the 12V, which is typically available in an automobile.

In addition, the sensor 10 might include one or more types of emitters. For instance, an internal IR emitter 30 might provide a signal appropriate for detecting or sensing objects at shorter distances (e.g., about or less than 20 cm). In addition (or alternatively), an external IR emitter might provide an increased IR signal, which is appropriate and sufficient to detect or sense objects that are farther away (e.g., about or greater than 20 cm).

In a further embodiment, the active IR sensor 10 includes an output converter 34 that configures a notification sent from the active IR sensor to be consistent with a protocol suitable for communication between electronic modules in a motor vehicle. For instance, if the chip includes an Inter-integrated Circuit (I2C) Bus, which communicates using an I2C protocol, then the output converter 34 transforms the I2C-formatted messages to be readable by other electronic module in the motor vehicle.

A message generated by the output converter 34 might be transmitted to various other modules in the motor vehicle. For example, the message might be communicated to a central controller that manages the vehicle features, such as seat position, steering-wheel position, interior lighting, radio controls, mirror angles, and touch-screen configuration, among others. The central controller might take various conditions into account when determining a personalization of various features. For example, the central controller might also receive information sent from a smart key fob, which identifies a specific driver. An embodiment of the invention uses the combination of the key-fob driver identification and the driver-entry detection to personalize one or more motor vehicle features.

The active IR sensor 10 might be positioned in various locations within a motor vehicle to detect the entry of a driver into the motor vehicle. For example, the sensor 10 might be positioned in a driver-footwell region to detect when a driver's legs enter the vehicle. Detecting the driver entering the vehicle provides the ability to activate more features, as compared to some other systems that rely on door closure or the ignition switch, which are not time-linked to driver entry.

Figure 3:
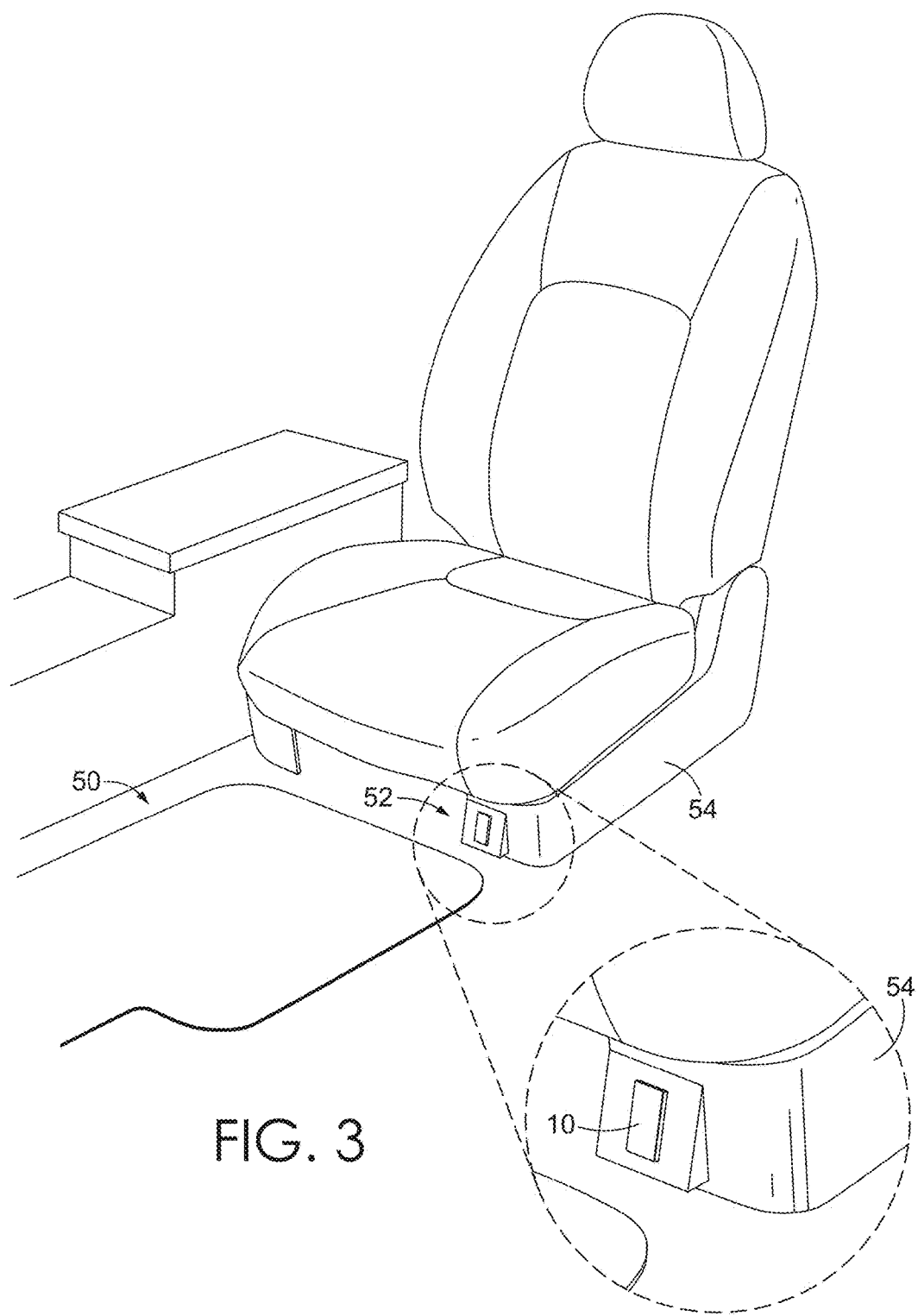
FIG. 3 depicts an exemplary seat for a motor vehicle in accordance with an embodiment of the present invention.

In order to detect driver entry when the driver seat is situated in any of a wide range of positions, the active IR sensor is packaged at the bottom of a seat according to one embodiment. For example, referring to FIG. 3, an exemplary position of an active IR sensor 10 is depicted that is attached to the outboard portion of the seat bottom. That is, the outboard portion 52 includes a seat trim cover 54 which conceals a seat support and track on which the seat support adjusts fore-and-aft positioning. In one embodiment, the sensor 10 is positioned behind the seat trim cover, in front of the outboard seat track. Accordingly, the sensor 10 is mounted to a hard surface, which provides a positive location. When mounted on the outboard seat trim cover 54, the IR sensor 10 is positioned to detect a driver's legs entering the footwell area 50 in a wide variety of scenarios, since the drivers' legs likely enter the vehicle at a similar distance relative to the seat, regardless of the seat position or driver size. As such, the IR sensor 10 is positioned to detect drivers when the drivers' have various sizes and heights and when the seat is set at various positions fore and aft.

The IR sensor 10 provides other benefits, as well. For example, the IR sensor 10 has favorable cost compared to vision, weight, and other driver-detection technologies. In addition, the IR sensor 10 does not need to be packaged in the seat foam, like weight-based and capacitive systems, thereby reducing the difficulty of packaging the IR sensor 10.

Referring now to FIG. 4, a flow diagram is depicted that includes steps 410 carried out in accordance with an embodiment of the present invention. The steps might be embodied in various manners. One embodiment of the invention includes a method 400 for personalizing a feature of a motor vehicle. In another embodiment, the steps are stored as computer-readable instructions on a computer memory device (e.g., memory 42). In describing the method 400, reference might also be made to FIGS. 1-3.

Step 412 includes transmitting an infrared signal into a footwell of the motor vehicle. For example, IR emitter 12 might transmit signals 14 into a footwell region 50 of a motor vehicle. At step 414, a reflected infrared signal is received. For example, photo diode 20 might receive the reflected signal 18.

The method 410 also includes, in response to receiving the reflected signal, step 416 for generating a notification that an occupant entered the motor vehicle. For example, a notification might be generated by the IR sensor 10 or the output converter 34. Further, at step 418, a personalized feature is applied in response to the notification. For instance, once the notification is transmitted to a central controller of the motor vehicle, the central controller applies a personalized feature.

The method 410 might be applied in various contexts, which include other steps or elements. For example, a driver preference often includes a seat position in which a particular driver operates the motor vehicle (i.e., an operating seat position). In some instances, the driver seat is adjusted rearward after the motor vehicle is turned off in order to make egress and ingress easier. For instance, the seat might be manually slid rearward or a feature of the motor vehicle might automatically slide the seat rearward. When the driver re-enters the vehicle, it is desirable for the driver seat to be re-positioned in the operating seat position. The present invention (i.e., active IR sensor 10) detects driver re-entry relatively early in the pre-ignition process when the driver's legs enter the footwell. For example, the present invention allows re-entry to be detected prior to various other events, such as starting the ignition, door closure, sitting in the driver's seat, and the like. Once driver re-entry is detected using the present invention, the position of the seat is re-established to the operating seat position in which the seat was positioned when the motor vehicle was last driven. The present invention detects driver re-entry independently from, and regardless of, the manner in which the door is opened or unlocked (e.g., manual, smart-phone detection, smart key fob, dumb key fob, and the like).

The method 410 might include other elements as well. For instance, the reflected IR signal might be received by a photo diode, which transmits an indication to a microprocessor that the reflected signal was received and that complies with an Inter-integrated Circuit protocol. In response, the microprocessor generates the notification complying with an automotive-compatible protocol. In addition, applying the personalized feature might include various elements, such as adjusting to a personalized seat position, adjusting to a personalized steering-wheel position, illuminating an ignition, setting a radio station, rendering a personalized navigation screen, or a combination thereof.

The method 410 might include other elements as well. For instance, in a motor-vehicle context, a 12V power supply might be converted by a power-logic component into a sensor-usable voltage (e.g., 3.3V). In addition, the IR signal that is emitted might be increased, such that the IR sensor includes a detection range of more than about 20 cm into the footwell.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Claimed are:

1. An active infrared (IR) sensor assembly to detect an occupant, comprising:
    a housing and said housing further comprising: an IR emitter that transmits a signal;
    a photo diode to detect a reflection of the signal;
    a microcontroller commutatively coupled to said photo diode to receive an indication of the reflected signal from the photo diode, wherein the microcontroller processes the reflected signal to create a notification signal that entry of a vehicle occupant into the motor vehicle has been detected, said microcontroller also having a memory wherein personalized seat occupant information is stored, said information being taken from the group comprising one or more of a seat position, a steering wheel position, illumination settings, audio settings and navigation screen features, said information being applied upon receipt of said reflected signal;
    an output converter to convert the notification signal to an automotive-compatible signal protocol; and
    a power conditioner to provide an appropriate voltage to said IR emitter said photo diode and said microcontroller.

2. The active IR sensor assembly of claim 1, further comprising an ambient light sensor coupled to the microcontroller.

3. The active IR sensor assembly of claim 1, further includes an external IR emitter having a sensing range that is at least 20 cm.

4. The active IR sensor assembly of claim 1, wherein the automotive-compatible signal protocol is an Inter-integrated Circuit (I2C) communication bus protocol.

5. A seat system for a motor vehicle comprising:
    a seat bottom;
    a seat base that connects the seat bottom to a vehicle floor and that includes an inboard portion and an outboard portion; and
    an active infrared (IR) sensor assembly that is coupled to the seat bottom and that comprises:
    an infrared emitter that transmits an infrared signal;
    a photo diode detector that detects a reflected infrared signal; and
    a microcontroller commutatively coupled to said photo diode, said microcontroller also having a memory wherein personalized seat occupant information is stored, said information being taken from the group comprising one or more of a seat position, a steering wheel position, illumination settings, audio settings and navigation screen features, said information being applied upon receipt of said reflected infrared signal.

6. The seat of claim 5, wherein the active IR sensor is coupled on the outboard portion.

7. The seat of claim 6, wherein the outboard portion comprises a seat trim cover that at least partially conceals an outboard seat track and wherein the active IR sensor assembly is coupled to the seat trim cover.

8. The seat of claim 5, wherein the IR emitter transmits the infrared signal into a footwell region in front of the seat.

9. The seat of claim 8, wherein the active IR sensor assembly further comprises an external IR emitter coupled to the IR emitter assembly, and wherein the external IR emitter increases a sensing range of the active IR sensor assembly to a distance into the footwell region that is at least 20 cm.

10. The seat of claim 9, wherein said microprocessor receives an indication of the reflected IR signal was detected, said active IR sensor assembly further including an output converter that converts the indication to an automotive-compatible protocol.

11. The seat of claim 10 further comprising, a power conditioner to provide an appropriate voltage to said IR emitter, said photo diode detector and said microcontroller.

12. The seat of claim 5, wherein the active IR sensor assembly is coupled to a portion of the seat bottom that traverses to a fore and an aft direction together with the seat, as the seat is adjusted fore and aft.

13. A method, comprising:
    forming an active IR sensor assembly having an IR emitter, an IR receiver and a microcontroller, said microcontroller also having a memory wherein personalized seat occupant information is stored, said information being taken from the group comprising one or more of a seat position, a steering wheel position, illumination settings, audio settings and navigation screen features, said information being applied upon receipt of a reflected infrared signal;
    attaching said sensor assembly to the driver's seat base;
    transmitting an infrared signal into a footwell of a motor vehicle;
    receiving a reflected infrared signal;
    generating a notification signal that an occupant entered the motor vehicle in response to receiving a reflected signal; and
    applying at least one of said personalized features in response to the notification signal.

14. The method of claim 13 further comprising, increasing the IR signal to include a detection range of at least 20 cm into the footwell.

* * * * *